US010203141B1

United States Patent
Chretien et al.

(10) Patent No.: US 10,203,141 B1
(45) Date of Patent: Feb. 12, 2019

(54) MULTI-STAGE COMPRESSOR WITH VARIABLE SPEED DRIVE AND METHOD OF USE

(71) Applicant: Regal Beloit America, Inc., Beloit, WI (US)

(72) Inventors: Ludovic Andre Chretien, Columbia City, IN (US); Norman C. Golm, Jr., Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 15/334,101

(22) Filed: Oct. 25, 2016

(51) Int. Cl.
| | |
|---|---|
| *F25B 49/02* | (2006.01) |
| *F25B 1/10* | (2006.01) |
| *F04D 27/00* | (2006.01) |

(52) U.S. Cl.
CPC .......... *F25B 49/025* (2013.01); *F04D 27/004* (2013.01); *F25B 1/10* (2013.01); *F25B 2600/0253* (2013.01); *F25B 2600/111* (2013.01)

(58) Field of Classification Search
CPC .... F25B 49/022; F25B 49/025; F25B 49/026; F04D 27/004
USPC .......................................................... 62/236
See application file for complete search history.

(56) References Cited

U.S. PATENT DOCUMENTS

| | | | | |
|---|---|---|---|---|
| 4,566,289 A | * | 1/1986 | Iizuka | F25B 49/025 |
| | | | | 318/807 |
| 4,787,211 A | * | 11/1988 | Shaw | F25B 1/10 |
| | | | | 417/248 |
| 4,876,859 A | * | 10/1989 | Kitamoto | F25B 49/022 |
| | | | | 62/117 |
| 4,947,655 A | * | 8/1990 | Shaw | F25B 1/10 |
| | | | | 62/200 |
| 4,988,930 A | * | 1/1991 | Oberheide | F01P 7/048 |
| | | | | 318/42 |
| 5,570,585 A | * | 11/1996 | Vaynberg | F25B 1/10 |
| | | | | 62/175 |
| 6,246,207 B1 | | 6/2001 | VanSistine et al. | |
| 7,760,497 B2 | * | 7/2010 | Eddy | E04G 3/32 |
| | | | | 182/148 |
| 8,981,705 B2 | | 3/2015 | Ramu | |
| 9,631,852 B2 | * | 4/2017 | Kopko | F25B 49/025 |
| 9,803,803 B1 | * | 10/2017 | Adams | F17C 5/06 |

(Continued)

*Primary Examiner* — Ljiljana Ciric
*Assistant Examiner* — Alexis Cox
(74) *Attorney, Agent, or Firm* — Armstrong Teasdale LLP

(57) ABSTRACT

A control system for a multi-stage compressor. The control system includes an AC line voltage source, a variable-voltage variable-frequency drive, and a processor. The AC line voltage source is configured to operate the multi-stage compressor. The variable-voltage variable-frequency drive is coupled to the AC line voltage source and is configured to operate the multi-stage compressor at a variable speed. The processor is coupled to the AC line voltage source and the variable-voltage variable-frequency drive, and is configured to alternatively coupled the AC line voltage source and the variable-voltage variable-frequency drive to the multi-stage compressor to operate the multi-stage compressor. The processor is further configured to transmit a capacity control signal to the multi-stage compressor. The capacity control signal is instructive to operate the multi-stage compressor in one of a high-capacity setting and a low-capacity setting.

11 Claims, 3 Drawing Sheets

(56) References Cited

U.S. PATENT DOCUMENTS

| | | | |
|---|---|---|---|
| 2002/0110461 A1* | 8/2002 | Iwanami | F04B 27/0895 417/321 |
| 2002/0134094 A1* | 9/2002 | Huh | F25B 49/022 62/175 |
| 2003/0051494 A1* | 3/2003 | Ohya | B60H 1/3205 62/199 |
| 2003/0169013 A1* | 9/2003 | Kadah | H02M 7/53871 318/727 |
| 2004/0159115 A1* | 8/2004 | Matsunaga | F04C 18/0215 62/228.1 |
| 2006/0032255 A1* | 2/2006 | Hwang | F25B 49/025 62/228.1 |
| 2006/0061321 A1 | 3/2006 | Han et al. | |
| 2006/0097687 A1 | 5/2006 | Byrnes, Jr. et al. | |
| 2008/0188173 A1* | 8/2008 | Chen | F04D 27/004 454/239 |
| 2008/0209925 A1* | 9/2008 | Pham | F25B 49/005 62/126 |
| 2009/0196764 A1* | 8/2009 | Fogarty | F04D 25/0606 417/44.1 |
| 2010/0064703 A1* | 3/2010 | Senf, Jr. | F25B 49/025 62/115 |
| 2010/0085000 A1* | 4/2010 | Todd | F25B 49/025 318/400.2 |
| 2010/0307191 A1* | 12/2010 | Sommer | F25B 1/10 62/505 |
| 2011/0144811 A1* | 6/2011 | Liu | F24F 11/008 700/276 |
| 2011/0234134 A1 | 9/2011 | Ramu | |

\* cited by examiner

MULTI-STAGE COMPRESSOR WITH VARIABLE SPEED DRIVE AND METHOD OF USE

BACKGROUND

The field of the disclosure relates generally to multi-stage compressors, and more specifically to a multi-stage compressor with a variable speed drive.

Known multi-stage compressors provide two or more levels of compression, e.g., a two-stage compressor provides a high and low compression level. Many known heating ventilation and cooling (HVAC) systems, such as, for example, an air conditioner or a heat pump, utilize two-stage compressors to provide two levels of cooling capacity. One level, i.e., the high-capacity setting, provides cooling for hot, high-demand days. Another level, i.e., the low-capacity setting, provides cooling, for example, for milder days or other low-cooling demand periods of time. A typical installation utilizes the low-capacity setting 80% of the time, resulting in improved efficiency in operating the HVAC system. In such systems, the two-stage compressor operates for longer periods of time, produces less noise, and produces more even temperatures. Accordingly, multi-stage HVAC systems provide greater comfort and operate with greater efficiency.

A typical two-stage HVAC system operates at 100% capacity on the high-capacity setting and at about 66% capacity on the low-capacity setting. Such systems demonstrate an improved, i.e., higher, seasonal energy efficiency ratio (SEER) when operating at lower capacity. Efficiency improvements are gained in part by more efficient operation of the compressor, and also through operation of the indoor and outdoor fans at lower speeds. Typically, the system is more efficient at lower compressor capacity. Efficiency improvements are typically limited in this regard, in that the two-stage compressor cannot operate at a low enough capacity to match the cooling load or achieve the efficiencies of fully variable speed systems.

BRIEF DESCRIPTION

In one aspect, a control system for a multi-stage compressor is provided. The control system includes an AC line voltage source, a variable-voltage variable-frequency drive, and a processor. The AC line voltage source is configured to operate the multi-stage compressor. The variable-voltage variable-frequency drive is coupled to the AC line voltage source and is configured to operate the multi-stage compressor at a variable speed. The Processor is coupled to the AC line voltage source and the variable-voltage variable-frequency drive, and is configured to alternatively coupled the AC line voltage source and the variable-voltage variable-frequency drive to the multi-stage compressor to operate the multi-stage compressor. The processor is further configured to transmit a capacity control signal to the multi-stage compressor. The capacity control signal is instructive to operate the multi-stage compressor in one of a high-capacity setting and a low-capacity setting.

In another aspect, a method of operating a multi-stage compressor is provided. The multi-stage compressor is coupled to a variable-voltage variable-frequency drive. The method includes determining a cooling load, or cooling demand, for the multi-stage compressor. The method includes selecting a cooling capacity setting based on the cooling load. The cooling capacity setting is the setting at which the multi-stage compressor should operate. The cooling capacity setting is selected from among a high-capacity setting and a low-capacity setting. The method includes transmitting a capacity control signal to the multi-stage compressor. The capacity control signal is instructive to operate the multi-stage compressor at the cooling capacity setting. The method includes selecting a power source based on the cooling load. The power source is selected from among an AC line voltage source and the variable-voltage variable-frequency drive for operating the multi-stage compressor. The method includes operating the multi-stage compressor at the cooling capacity setting using the selected power source.

In yet another aspect, an HVAC system is provided. The HVAC system includes a multi-stage compressor, a variable-voltage variable-frequency drive, and a processor. The multi-stage compressor is configured to operate alternatively at a high-capacity setting and a low-capacity setting to provide a cooling output. The variable-voltage variable-frequency drive is coupled to the multi-stage compressor and is configured to operate the multi-stage compressor at a variable speed. The processor is coupled to the multi-stage compressor and the variable-voltage variable-frequency drive. The processor is configured to select one of the high-capacity setting and the low capacity setting at which the multi-stage compressor should operate based on a cooling load for determined for the multi-stage compressor. The processor is configured to employ the variable-voltage variable-frequency drive to operate the multi-stage compressor at the variable speed to match the cooling output to the cooling load. The processor is further configured to bypass the variable-voltage variable-frequency drive when operating the multi-stage compressor for a maximum cooling output.

DETAILED DESCRIPTION

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Single-stage and multi-stage, such as, for example, and without limitation, two-stage HVAC systems generally cannot vary the speed of the compressor. Although two-stage compressors can operate at a lower capacity, e.g., 66%, the lower capacity is typically not as low as is achieved in variable speed compressors. Consequently, such systems cannot match the cooling load during mild conditions, resulting in shortened operating periods, frequent cycling, and greater temperature variations. Variable speed HVAC systems are typically more complex due to the necessary electronics to match the drive speed to the cooling load, but do provide more efficient and more comfortable cooling over a wider range of cooling loads. Cooling loads, in certain embodiments, may be measured or estimated.

Embodiments of the present disclosure, it is realized herein, provide a combination of a multi-stage compressor and a variable speed drive that provide an even greater range of efficient operation and further improve SEER, in some cases, for example, in excess of 5 SEER. More specifically, embodiments of the HVAC systems described herein may utilize a multi-stage compressor in combination with a variable-voltage variable-frequency drive. It is further realized herein that such an HVAC system may be operated in various configurations, including at high-capacity with the variable-voltage variable frequency drive, at low-capacity with the variable-voltage variable-frequency drive, at high-capacity with alternating current (AC) line voltage, and at low-capacity with AC line voltage. More specifically, as realized herein, in certain embodiments, operation of the multi-stage compressor at high-capacity with AC line voltage provides a high-capacity setting, operation at low-capacity with AC line voltage provides a medium-capacity setting, and operation at low-capacity with the variable-voltage variable-frequency drive provides a range of low-capacity settings varying in speed. It is further realized herein that, by foregoing operation at high-capacity with the variable-voltage variable-frequency drive, a lower-rated variable-voltage variable-frequency drive may be utilized. It is further realized herein that bypassing the variable-voltage variable-frequency drive for the high-capacity setting and the medium-capacity setting further improves efficiency by eliminating operating losses of the variable-voltage variable-frequency drive.

Figure 1:
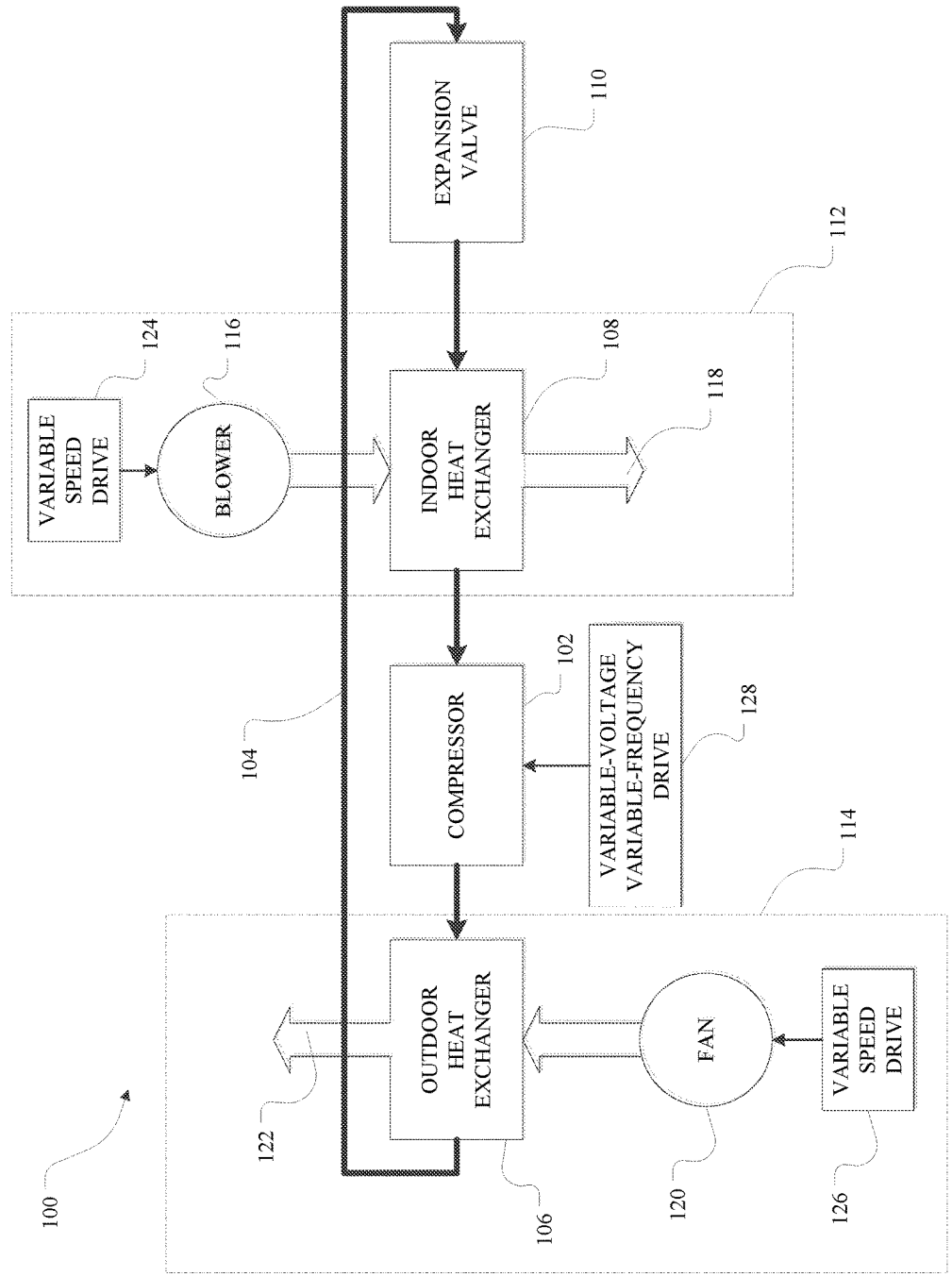
FIG. 1 is a block diagram of an exemplary HVAC system.

FIG. 1 is a block diagram of an exemplary HVAC system 100. HVAC system 100 includes a compressor 102 that compresses a refrigerant 104 to produce a pressure within HVAC system 100 and a resulting flow of refrigerant 104. Compressor 102 is a two-stage compressor having two distinct levels of capacity at which compressor 102 may operate. In alternative embodiments, compressor 102 may have 3 or more levels of capacity. The levels of capacity are referred to as a high-capacity setting and a low-capacity setting, which further refers to the cooling capacity available at the respective levels of capacity. Generally, compressor 102 consumes more energy, i.e., electrical power, and is less efficient when operating at the high-capacity setting versus the low-capacity setting. A typical installation of HVAC system 100 operates compressor 102 at the low-capacity setting about 80% of its operating time.

HVAC system 100 includes an outdoor heat exchanger 106, an indoor heat exchanger 108, and an expansion valve 110. Compressor 102 generates the flow of refrigerant 104 through each of outdoor heat exchanger 106, indoor heat exchanger 108, and expansion valve 110 to cool an interior space 112. Heat from interior space 112 is carried by refrigerant 104 and transferred to an exterior space 114. Interior space 112 and exterior space 114 combine to define a cooling load for HVAC system 100 as a function of a temperature set point for interior space 112 and an ambient temperature of exterior space 114. When operating as a heat pump, HVAC system 100 operates in reverse, carrying heat from exterior space 114 into interior space 112.

During operation, as cool low-pressure refrigerant 104 moves through indoor heat exchanger 108, a blower 116 generates an interior airflow 118 through indoor heat exchanger 108. Interior airflow 118 carries warm air from interior space 112 through indoor heat exchanger 108, thereby cooling interior airflow 118 and heating refrigerant 104. Low-pressure refrigerant 104 flows from indoor heat exchanger 108 into compressor 102 and is compressed, raising the temperature and pressure of refrigerant 104 before it flows into outdoor heat exchanger 106. HVAC system 100 includes a fan 120 that generates an exterior airflow 122 through outdoor heat exchanger 106. As hot high-pressure refrigerant 104 moves through outdoor heat exchanger 106, exterior airflow 122 carriers ambient air from exterior space 114 through outdoor heat exchanger 106, thereby cooling refrigerant 104 and heating exterior airflow 122. High-pressure refrigerant 104 flows from outdoor heat exchanger 106 into expansion valve 110, where refrigerant 104 is decompressed and cooled before flowing back into indoor heat exchanger 108.

HVAC system 100 also includes a variable speed drive 124 coupled to blower 116 and configured to turn blower 116 at a variable speed. The speed at which blower 116 turns determines the volume of air in interior airflow 118 that moves through indoor heat exchanger 108. Moreover, the efficiency with which energy is transferred from the warm interior airflow 118 to the cool low-pressure refrigerant 104 flowing through indoor heat exchanger 108 is a function of the volume of air and the speed at which blower 116 turns. Further, the speed of blower 116 that is necessary to achieve efficient energy transfer may be reduced as the cooling load decreases. The speed of blower 116 may be further decreases when compressor 102 is operated at low-capacity.

HVAC system 100 includes a variable speed drive 126 coupled to fan 120 and configured to turn fan 120 at a variable speed. The speed at which fan 120 turns determines the volume of air in exterior airflow 122 that moves through outdoor heat exchanger 108. Moreover, the efficiency with which energy is transferred from the warm high-pressure refrigerant 104 flowing through outdoor heat exchanger 106 to exterior airflow 122 is a function of the volume of air and the speed at which fan 120 turns. Further, the speed of fan 120 that is necessary to achieve efficient energy transfer may be reduced as the cooling load decreases. The speed of fan 120 may be further decreases when compressor 102 is operated at low-capacity.

HVAC system 100 includes a variable-voltage variable-frequency drive 128 coupled to compressor 102. Variable-voltage variable-frequency drive 128 provides power to compressor 102 and regulates the output voltage and frequency to control the speed at which compressor 102 operates, thereby affecting the cooling capacity of compressor 102. At lower speeds, compressor 102 operates at a lower cooling capacity. At higher speeds, compressor 102 operates at a higher cooling capacity. Compressor 102 may be combined with variable-voltage variable-frequency drive 128 in various manners, including operating at a variable speed at the high-capacity setting, and operating at a variable speed at the low-capacity setting. Further, compressor 102 may be operated at AC line voltage to achieve respective maximum cooling capacities at the high-capacity setting and the low-capacity setting. More specifically, when operating compressor 102 at AC line voltage, variable-voltage variable-frequency drive 128 is bypassed, thereby eliminating the operating losses introduced by variable-voltage variable-frequency drive 128.

Figure 2:
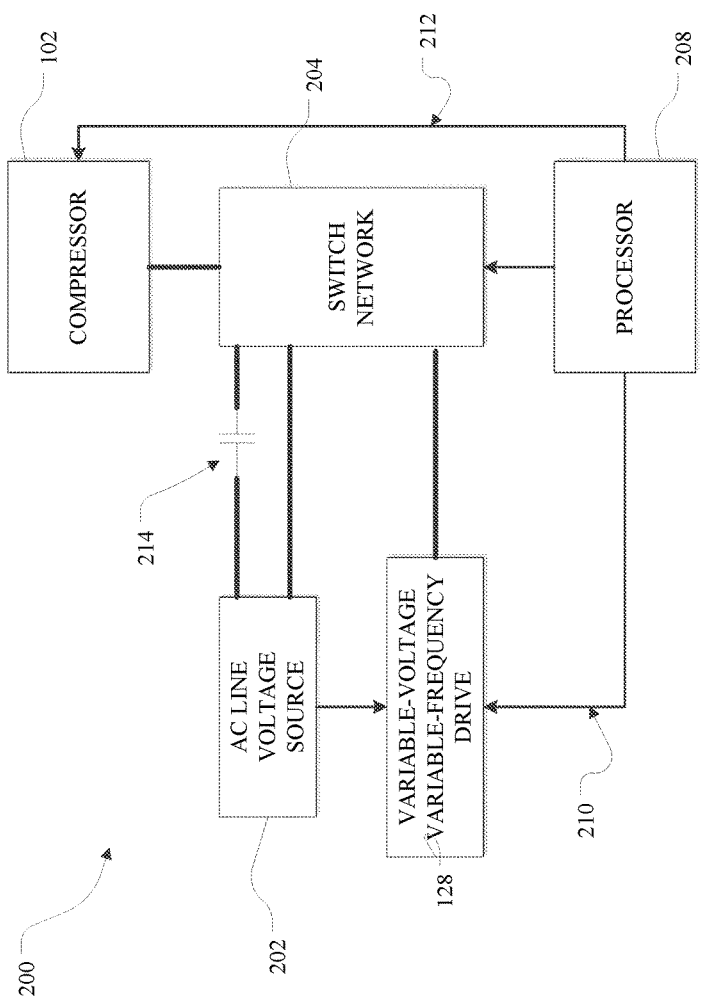
FIG. 2 is a schematic diagram of one embodiment of a control system for use in the HVAC system shown in FIG. 1.

FIG. 2 is a block diagram of an exemplary control system 200 for use with HVAC system 100 shown in FIG. 1 and, more specifically, compressor 102. Control system 200 includes an AC line voltage source 202 and variable-voltage variable-frequency drive 128 that are alternatively coupled to compressor 102 through a switching network 204 to operate compressor 102. For example, AC line voltage source 202 is coupled to compressor 102 through a run capacitor 214 and directly by closing corresponding switches within switching network 204 and decoupling variable-voltage variable-frequency drive 128. Similarly, AC line voltage source 202 is decoupled from compressor 102 by opening corresponding switches within switching network 204, coupling variable-voltage variable-frequency drive 128 to compressor 102, and bypassing run capacitor 214. In alternative embodiments, AC line voltage source 202 and variable-voltage variable-frequency drive 128 may be alternatively coupled and decoupled from compressor 102 using any suitable switching device or network of switching devices, including, for example, and without limitation, electromechanical relays, field effect transistor (FET) devices, insulated-gate bipolar transistors (IGBTs), and other power electronics. AC line voltage source 202 provides an AC line voltage signal, such as, for example 60 Hertz 240 Volt. In alternative embodiments, AC line voltage source may provide other frequencies and voltages according to the grid requirements for that particular implementation. For example, certain countries utilize 50 Hertz as a line frequency. Similarly, certain countries utilize 230 Volt as a line voltage. AC line voltage source 202 may include a terminal block or bus configured to provide line voltage. In certain embodiments, AC line voltage source 202 may include a main system relay configured to switch AC line voltage to compressor 102, HVAC system 100, or both, for example.

Control system 200 includes a processor 208. Processor 208 is coupled to switching network 204. Processor 208 controls switching network 204 to alternatively couple AC line voltage source 202 and variable-voltage variable-frequency drive 128 to compressor 102. Processor 208 is further coupled to variable-voltage variable-frequency drive 128 to control the speed at which compressor 102 is operated when operated by variable-voltage variable-frequency drive 128. Processor 208 transmits a speed control signal 210 to variable-voltage variable-frequency drive 128 to affect the speed at which compressor 102 is operated. Speed control signal 210 received by variable-voltage variable-frequency drive 128 is instructive to operate compressor 102 at a variable speed. Processor 208 is further coupled to compressor 102. Processor 208 transmits a capacity control signal 212 to compressor 102. Capacity control signal 212, when received by compressor 102, is instructive to operate compressor 102 at either a high-capacity setting or a low-capacity setting. In certain embodiments, processor 208 is integrated with variable-voltage variable-frequency drive 128.

In certain embodiments, processor 208 is configured to couple AC line voltage source 202 to compressor 102 and bypass variable-voltage variable-frequency drive 128, thereby eliminating the operating losses introduced by variable-voltage variable-frequency drive 128.

Figure 3:
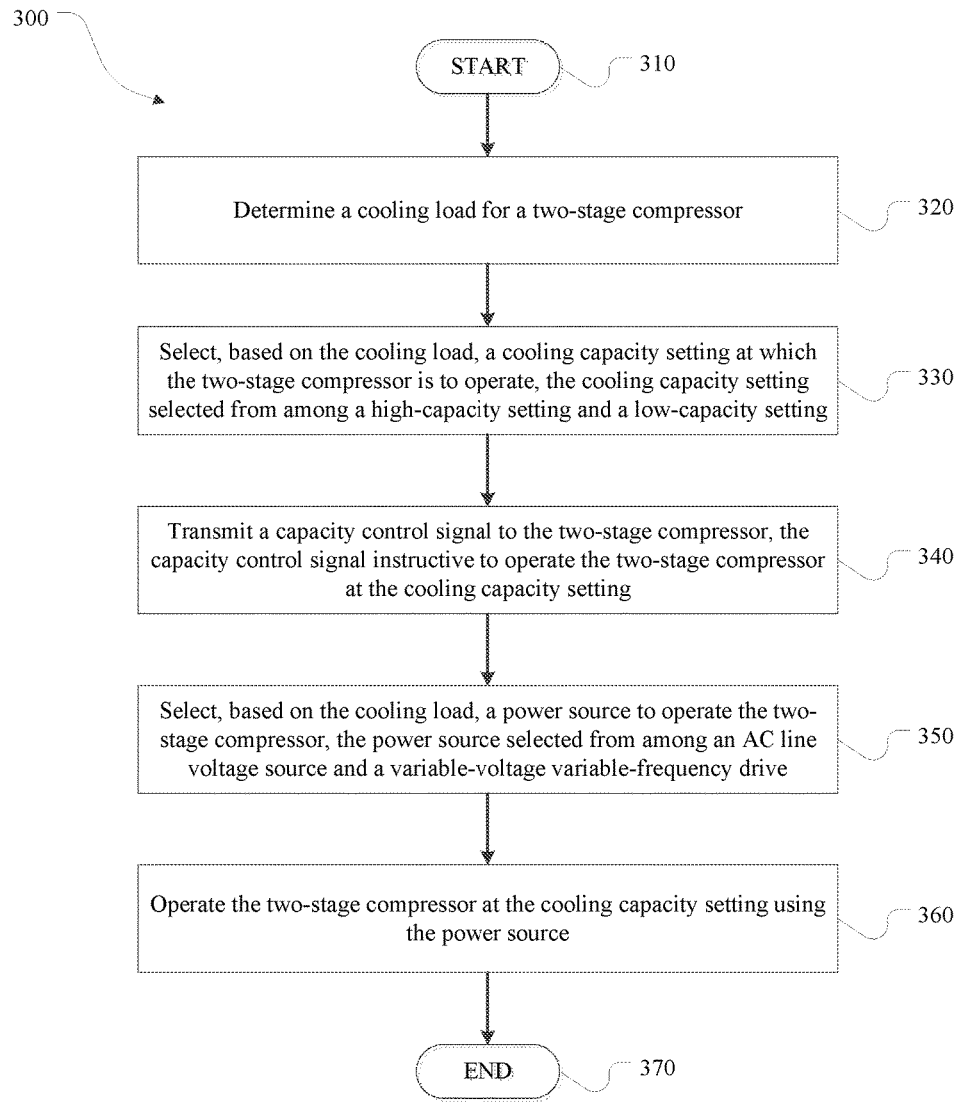
FIG. 3 is a flow diagram of an exemplary method of operating a multi-stage compressor, such as the multi-stage compressor shown in FIG. 1.

FIG. 3 is a flow diagram of an exemplary method 300 of operating compressor 102, shown in FIGS. 1 and 2. Method 300 begins at a start step 310. Processor 208 determines a cooling load for compressor 102 at a determination step 320. The cooling load is determined as a function of a temperature set point for interior space 112 and an ambient temperature for exterior space 114.

At a capacity selection step 330, processor 208 selects a cooling capacity setting based on the determined cooling load. The cooling capacity setting is selected from among the high-capacity setting and the low-capacity setting for compressor 102. Generally, processor 208 selects the high-capacity setting when the cooling load is large, and selects the low-capacity setting when the cooling load is smaller.

Processor 208 transmits a capacity control signal 212 to compressor 102 at a capacity control step 340. Capacity control signal 212 is instructive to operate compressor 102 at the selected cooling capacity setting, i.e., the high-capacity setting or the low-capacity setting.

At a power source selection step 350, processor 208 selects a power source to operate compressor 102 based on the determined cooling load. The power source is selected by processor 208 from among AC line voltage source 202 and variable-voltage variable-frequency drive 128. Given the capacity selection at capacity selection step 330 and the determined cooling load, processor 208 selects either AC line voltage source 202 or variable-voltage variable-frequency drive 128 to match the cooling output of compressor 102 during operation 360 of compressor 102 with the determined cooling load. For example, when the cooling load is at its maximum, processor 208 selects 330 the high-capacity setting for compressor 102 and operates 360 compressor 102 with AC line voltage source 202 as the power source to produce the maximum cooling output. Likewise, when the cooling load is minimal, processor 208 selects 330 the low-capacity setting and operates 360 compressor 102 using variable-voltage variable-frequency drive 128 to achieve a low speed and low cooling output, thereby improving the efficiency of compressor 102. Further, when the cooling load is at an intermediate level, in certain embodiments, processor 208 selects 330 the low-capacity setting and further selects 350 AC line voltage source 202 to operate 360 compressor 102 at the maximum cooling capacity for the low-capacity setting. Moreover, in such embodiments, variable-voltage variable-frequency drive 128 is bypassed to eliminate the operating losses introduced by variable-voltage variable-frequency drive 128 when operated at a variable speed.

In certain embodiments, compressor 102 is only operable with variable-voltage variable-frequency drive 128 when compressor 102 is operated at the low-capacity setting. Consequently, when processor 208 selects 330 the high-capacity setting, processor 208 further selects 350 AC line voltage source 202 to operate 360 compressor 102. Method 300 terminates at an end step 370.

HVAC systems described herein provide a combination of a multi-stage compressor and a variable speed drive that provide an even greater range of efficient operation and further improve SEER, in some cases, for example, in excess of 5 SEER. More specifically, embodiments of the HVAC systems described herein may utilize a multi-stage compressor in combination with a variable-voltage variable-frequency drive. It is further realized herein that such an HVAC system may be operated in various configurations, including at high-capacity with the variable-voltage variable frequency drive, at low-capacity with the variable-voltage variable-frequency drive, at high-capacity with alternating current (AC) line voltage, and at low-capacity with AC line voltage. More specifically, as realized herein, in certain embodiments, operation of the multi-stage compressor at high-capacity with AC line voltage provides a high-capacity setting, operation at low-capacity with AC line voltage provides a medium-capacity setting, and operation at low-capacity with the variable-voltage variable-frequency drive provides a range of low-capacity settings varying in speed. It is further realized herein that, by foregoing operation at high-capacity with the variable-voltage variable-frequency drive, a lower-rated variable-voltage variable-frequency drive may be utilized. It is further realized herein that bypassing the variable-voltage variable-frequency drive for the high-capacity setting and the medium-capacity setting further improves efficiency by eliminating forward operating losses of the variable-voltage variable-frequency drive.

The methods and systems described herein may be implemented using computer programming or engineering techniques including computer software, firmware, hardware or any combination or subset thereof, wherein the technical effect may include at least one of: (a) combining a multi-stage compressor with a variable speed drive, e.g., a variable-voltage variable-frequency drive; (b) reducing losses by bypassing the variable-voltage variable-frequency drive when operating at a line voltage, particularly at intermediate operating speeds; (c) operating the multi-stage compressor at a low-capacity and at a variable speed; (d) operating the two-stage compressor at less than 40% of full cooling capacity; (e) improving operating efficiency, e.g., SEER, of the multi-stage compressor and the HVAC system; (f) reducing the necessary fan speeds for heat transfer from heat exchangers during low cooling loads; (g) improving efficiency of the HVAC system further by lowering fan speeds to operate in a more efficient range of speeds; (h) operating the multi-stage compressor at a low-capacity for longer cycles; (i) improving efficiency and comfort due to more continuous low-capacity cooling; (j) improving compressor lubrication through use at higher rotational speed and lower capacity; and (k) reducing cost and complexity over variable speed compressors.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a multi-stage compressor, said control system comprising:
   an alternating current (AC) line voltage source configured to operate the multi-stage compressor;
   a variable-voltage variable-frequency drive coupled to said AC line voltage source and configured to operate the multi-stage compressor at a variable speed; and
   a processor coupled to the multi-stage compressor and said variable-voltage variable-frequency drive, said processor configured to:
      selectively couple each of said AC line voltage source and said variable-voltage variable-frequency drive to the multi-stage compressor to power the multi-stage compressor; and
      transmit a capacity control signal to the multi-stage compressor to operate the multi-stage compressor in one of a high-capacity setting to provide a high cooling output, and a low-capacity setting to provide a low cooling output, responsive to the capacity control signal,
      wherein a combination of the selective coupling and transmitting the capacity control signal enables said processor to operate the multi-stage compressor: (a) under the high-capacity setting and powered by said AC line voltage source that bypasses said variable-voltage variable-frequency drive, (b) under the high-capacity setting and powered by said variable-voltage variable-frequency drive, (c) under the low-capacity setting and powered by said AC line voltage source that bypasses said variable-voltage variable-frequency drive, and (d) under the low-capacity setting and powered by said variable-voltage variable-frequency drive.

2. The control system of claim 1, wherein said processor is further configured to transmit a speed control signal to said variable-voltage variable-frequency drive to set the variable speed at which the multi-stage compressor operates.

3. The control system of claim 2, wherein said processor is further configured to select the variable speed at which the multi-stage compressor operates according to a measured cooling load that is based on a function of a temperature set point for an interior space and an ambient temperature of an exterior space measured by a temperature sensor.

4. The control system of claim 1, wherein said processor is further configured to selectively couple said AC line voltage source and said variable-voltage variable-frequency drive to the multi-stage compressor based on an estimated cooling load.

5. The control system of claim 1, wherein said AC line voltage source comprises a switch network through which an AC line voltage is switched, the AC line voltage comprising a 60 Hertz 240 volt signal.

6. The control system of claim 1 further comprising a bypass circuit coupled to said variable-voltage variable-frequency drive, said bypass circuit configured to supply power to the multi-stage compressor using said AC line voltage source coupled in series with a capacitor, and bypass said variable-voltage variable-frequency drive.

7. A heating ventilation and air conditioning (HVAC) system, comprising:
 a multi-stage compressor configured to operate selectively at a high-capacity setting and a low-capacity setting to provide a high and a low cooling output, respectively;
 a variable-voltage variable-frequency drive coupled to said multi-stage compressor and configured to operate said multi-stage compressor at a variable speed; and
 a processor coupled to said multi-stage compressor and said variable-voltage variable-frequency drive, said processor configured to:
  select one of the high-capacity setting and the low capacity setting at which said multi-stage compressor should operate based on a cooling load determined for said multi-stage compressor, the cooling load based on a function of a temperature set point for an interior space and an ambient temperature of an exterior space measured by a temperature sensor;
  transmit a capacity control signal to the said multi-stage compressor to operate said multi-stage compressor in the selected one of the high-capacity setting and the low-capacity setting, responsive to the capacity control signal;
  selectively couple said multi-stage compressor to said variable-voltage variable-frequency drive to power said multi-stage compressor at the variable speed to match the cooling output to the cooling load; and
  selectively couple said multi-stage compressor to said AC line voltage to bypass said variable-voltage variable-frequency drive when operating said multi-stage compressor for a maximum cooling output;
 wherein a combination of the selecting one of the high- and low-capacity settings, transmitting the capacity control signal, and selectively coupling said multi-stage compressor to said variable-voltage variable-frequency drive and said AC line voltage enables said processor to operate said multi-stage compressor: (a) under the high-capacity setting and powered by said AC line voltage source that bypasses said variable-voltage variable-frequency drive, (b) under the high-capacity setting and powered by said variable-voltage variable-frequency drive, (c) under the low-capacity setting and powered by said AC line voltage source that bypasses said variable-voltage variable-frequency drive, and (d) under the low-capacity setting and powered by said variable-voltage variable-frequency drive.

8. The HVAC system of claim 7, wherein said processor is further configured to employ said variable-voltage variable-frequency drive when the low-capacity setting is selected.

9. The HVAC system of claim 7, wherein said processor is further configured to:
 determine the variable speed based on the cooling load; and
 transmit a speed control signal to said variable-voltage variable-frequency drive to operate said multi-stage compressor at the variable speed.

10. The HVAC system of claim 7 further comprising:
 a heat exchanger coupled to said multi-stage compressor configured to transfer energy between a compressed refrigerant from said multi-stage compressor and an airflow; and
 a fan configured turn at a fan speed to draw the airflow through said heat exchanger, the airflow having a volume defined as a function of the fan speed, wherein the volume is sufficient to transfer the energy.

11. The HVAC system of claim 10 further comprising a variable speed drive coupled to said fan, said variable speed drive configured to operate the fan at a variable speed to draw the airflow.

* * * * *